US012379875B1

(12) United States Patent
Costeff et al.

(10) Patent No.: US 12,379,875 B1
(45) Date of Patent: Aug. 5, 2025

(54) WRITING DATA TO A SHARED WRITE BUFFER

(71) Applicant: VAST DATA LTD., Tel Aviv (IL)

(72) Inventors: Hillel Costeff, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/401,317

(22) Filed: Dec. 29, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/067* (2013.01)

(58) Field of Classification Search
CPC .... G06F 3/0659; G06F 3/0604; G06F 3/0656; G06F 3/067
See application file for complete search history.

(56) References Cited

U.S. PATENT DOCUMENTS

| | | | | |
|---|---|---|---|---|
| 2017/0286018 | A1* | 10/2017 | Takada | G06F 3/0673 |
| 2020/0110692 | A1* | 4/2020 | Senin | G06F 11/3419 |
| 2020/0201740 | A1* | 6/2020 | Peipelman | G06F 3/0673 |
| 2021/0397357 | A1* | 12/2021 | Azuma | G06F 3/0689 |
| 2023/0359359 | A1* | 11/2023 | Chilton | G06F 3/0611 |

OTHER PUBLICATIONS

Huang et al.; Identifying the Major Sources of Variance in Transaction Latencies: Towards More Predictable Databases; accessed on arXiv.org at arXiv:1602.01871. Published 2016 (Year: 2016).*

* cited by examiner

*Primary Examiner* — Rocio Del Mar Perez-Velez
*Assistant Examiner* — Julian S Mendel
(74) *Attorney, Agent, or Firm* — Reches Patents

(57) ABSTRACT

A method for writing data to a shared write buffer, the method includes (i) receiving, by a processing circuit of a compute node of a storage system, a write request for writing to the shared write buffer an information unit associated with an accessing entity located outside the storage system; wherein the shared write buffer is stored in a non-volatile memory of a storage node of the storage system; the storage node is in communication with the compute node; (ii) determining, by the processing circuit whether to (a) store the information unit in a non-shared segment of the shared write buffer, or (b) store the information unit in a shared segment of the shared write buffer while applying a locking mechanism; wherein the determining is based on parameters, the parameters include a writing parameter of the accessing entity, a writing latency parameter associated with the accessing entity, and a locking timing parameter; and (iii) storing the information unit according to the determination.

17 Claims, 5 Drawing Sheets

WRITING DATA TO A SHARED WRITE BUFFER

BACKGROUND

A storage system is used for storing content generated by a vast number of accessing entities. The content has to be received and then eventually be stored in storage resources of the storage system, while considering the latency experienced by the accessing entities.

Latency is the time that takes to complete a user request, e.g., a write request, and to acknowledge the safe writing of user data in the storage system. Lock contention occurs when one process attempts to acquire a lock held by another process, causing a delay, since the process needs to wait for the lock to be freed.

There is a growing need to manage the reception and the storage of the content in an efficient manner.

SUMMARY

There may be provide a storage system, a method and a non-transitory computer readable medium for writing data to write buffers by multiple compute entities.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Write requests entering the storage system are being handled by multiple compute entities. The content related to the write requests may include the data requested to be written and/or metadata related to the data being written, such as the location of the temporal storage, length, etc.

The ingestion of the content includes writing the content to a non-volatile temporary storage space and then sending acknowledgement to the accessing entity (a client computer, a client application) that sent the write request. The ingestion process should consider the latency experienced by the accessing entities. Only after the write request is acknowledged, an asynchronous background process may perform striping, compression, encryption, and migration of the content written in the temporary storage space to a permanent storage space.

The temporary storage space is divided into large write buffers, and each write buffer may be split into smaller segments. The write buffer is shared among the compute entities that need to store information units (content such as data/metadata) of incoming write requests. A current segment of the multiple segments is a segment that is currently used by one or multiple compute entities for storing ingested content. A segment may be shared by multiple compute entities or may be assigned to one compute entity.

There may be two techniques for writing the content by the multiple compute entities. According to a first writing technique, multiple compute entities write content to a shared current segment. At any time, there may be a current shared segment that all or some of the compute entities that handle received write requests, write the corresponding content to that current shared segment.

Figure 1:
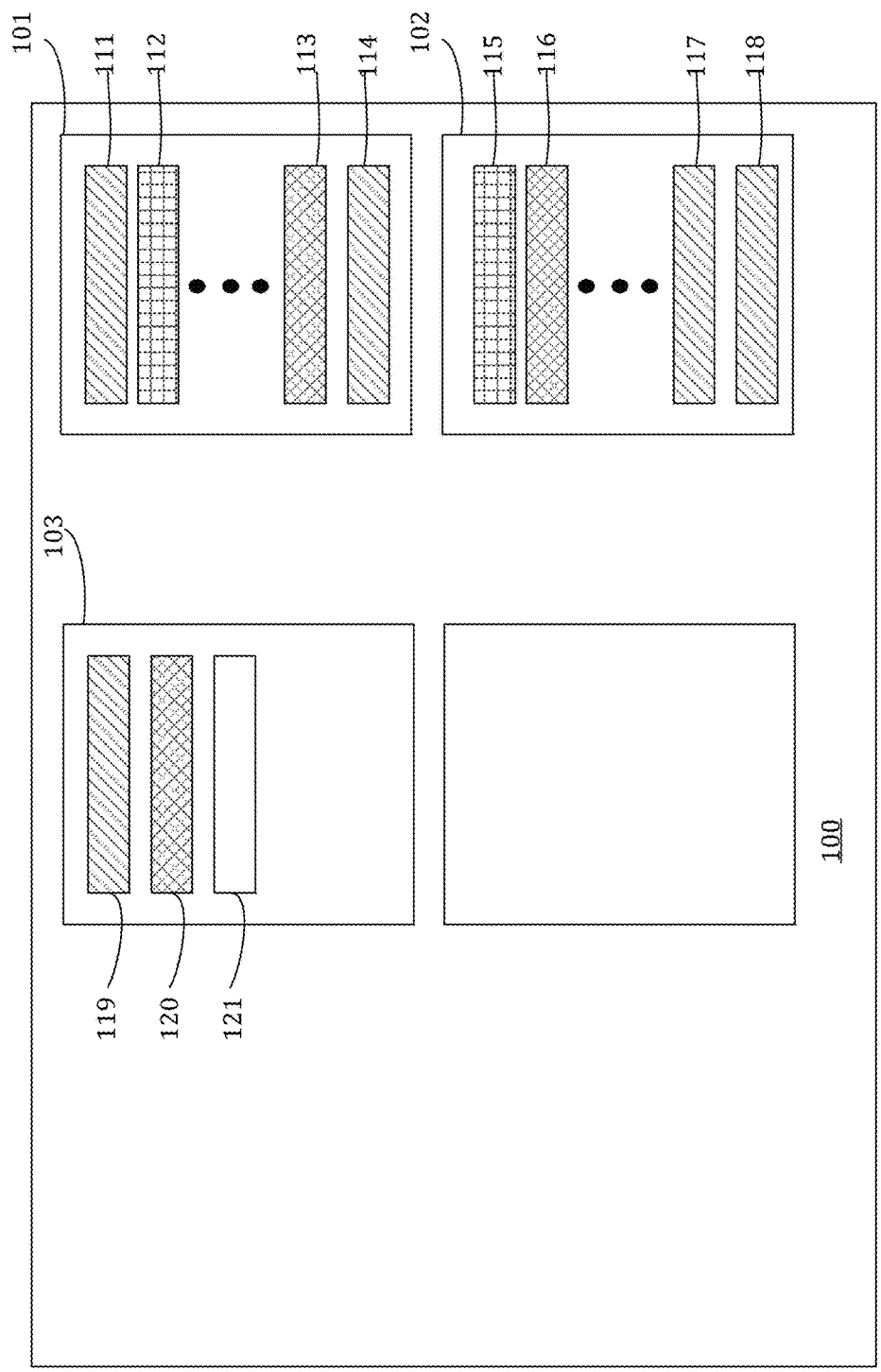
FIG. 1 illustrates an example of a shared write buffer.

For example, FIG. 1 illustrates filling up a write buffer 100 with content (information units) of write requests received by three compute entities that share the same current segment for storing the content. Segments 101 and 102 are full segments that were written with content related to write requests by three different compute entities, as illustrated by different patterns of cells 111-118 within the segments. Each cell stores content related to a write request. A first compute entity wrote content to cells 111, 114, 117 and 118. A second compute entity wrote content to cells 112 and 115. A third compute entity wrote content to cells 113 and 116. Segment 103 is the current shared segment, towards which all the current content related to currently handled write requests, is directed. Segment 103 is partially written, as only cells 119 (written by the first compute entity) and cell 120 (written by the third compute entity)—are full, while the rest of the cells, e.g., cell 121 is free for storing content by a next write request.

In order to allow writing content by multiple compute entities, measures are taken for handling mutual exclusion, such as locking the segment when a compute entity needs to write to the next available cell of the segment, so as to avoid writing to the same cell by two compute nodes.

Figure 2:
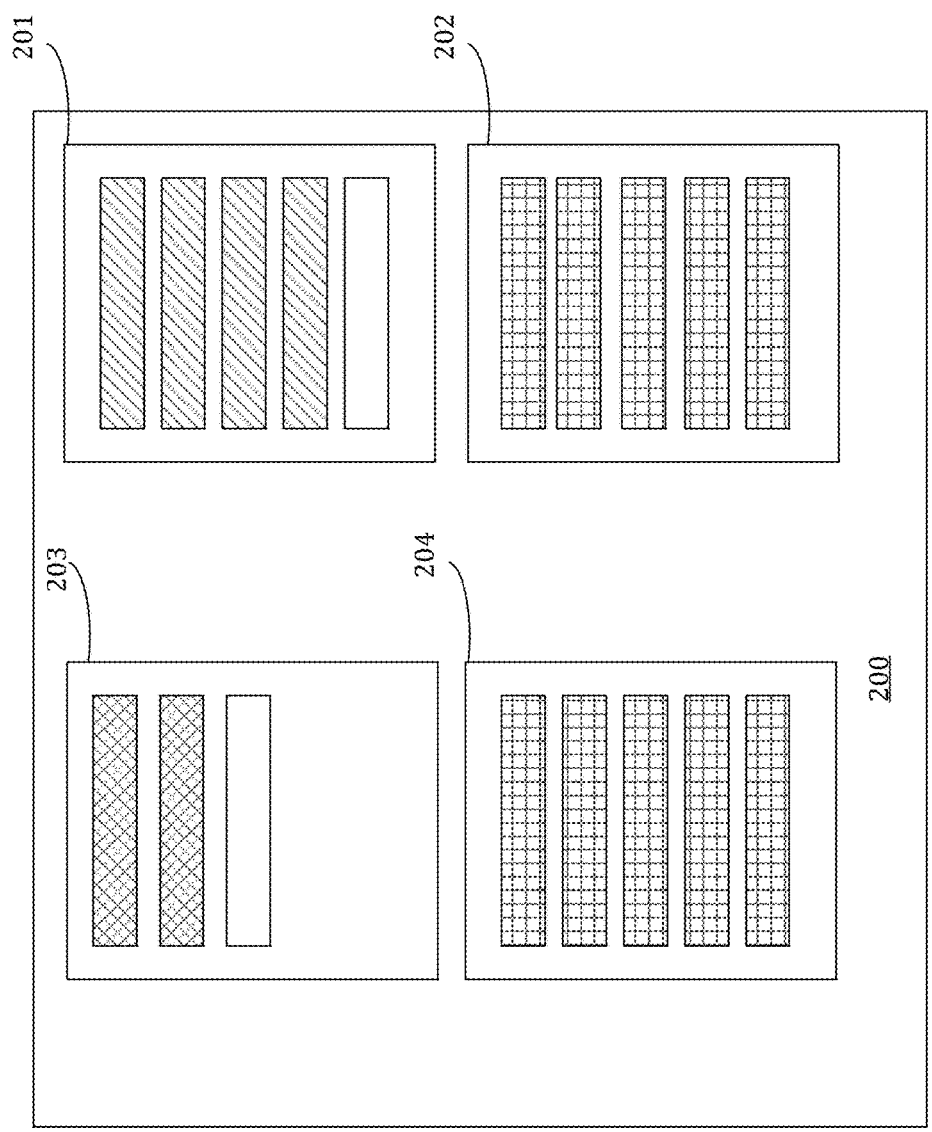
FIG. 2 illustrates an example of a shared write buffer.

According to a second writing technique, a compute entity that needs to write content allocates a private (non-shared) segment that is not shared with other compute entities. FIG. 2 illustrates filling up write buffer 200 with content of write requests received by the three compute entities that do not share the same segment for storing the content, but rather each compute entity writes to a dedicated private segment. For example, the first compute node writes to segment 201 exclusively, the second compute node wrote to segment 202 and 204 (which are now full) exclusively, and the third compute node writes to segment 203 exclusively.

There are advantages and disadvantages for each of the writing techniques, as will be specified below, and therefore both writing techniques may be used for writing to the same write buffer, according to the current needs and load characteristics.

The first writing technique requires locking the segment before writing to the next empty cell, and therefore may encounter contention delays, when multitude different compute entities need to write at the same time. The delay caused by the lock contention may increase the latency experienced by the users that sent the write requests. The advantage of this writing technique is that it is efficient in terms of space utilization, since all the segments are fully used except the current shared segment that is currently being filled up with content. When the last segment is filled up with content, the entire write buffer is filled up with content.

The second writing technique eliminates the need for locking and therefore may be more efficient in terms of the latency experienced by users that sent the write requests which content is being written without needing to lock (and therefore avoiding delay of lock contention). However, this writing technique may cause wasting space of the write buffer. For example, in FIG. 2, both segments 201 and 203 of the first and second compute nodes—are not full, while the first compute node needs to start writing to a new segment that is not available in the current write buffer. There may be time constraints on migrating the write buffer's content into a permanent storage space, and there may be a need to evacuate the write buffer 200 after a certain time period, e.g., after 100 msec. These time constraints may be caused by the need to apply a better resiliency scheme that is applied upon migration, or since the number of write buffers is limited. Therefore, the current write buffer may be evacuated before segments 201 and 203 are full. Although FIG. 2 illustrates only two segments that are non-full private segments, there may be multitude segments that are partially occupied by multitude compute nodes, and therefore the space waste may be significant.

Figure 3:
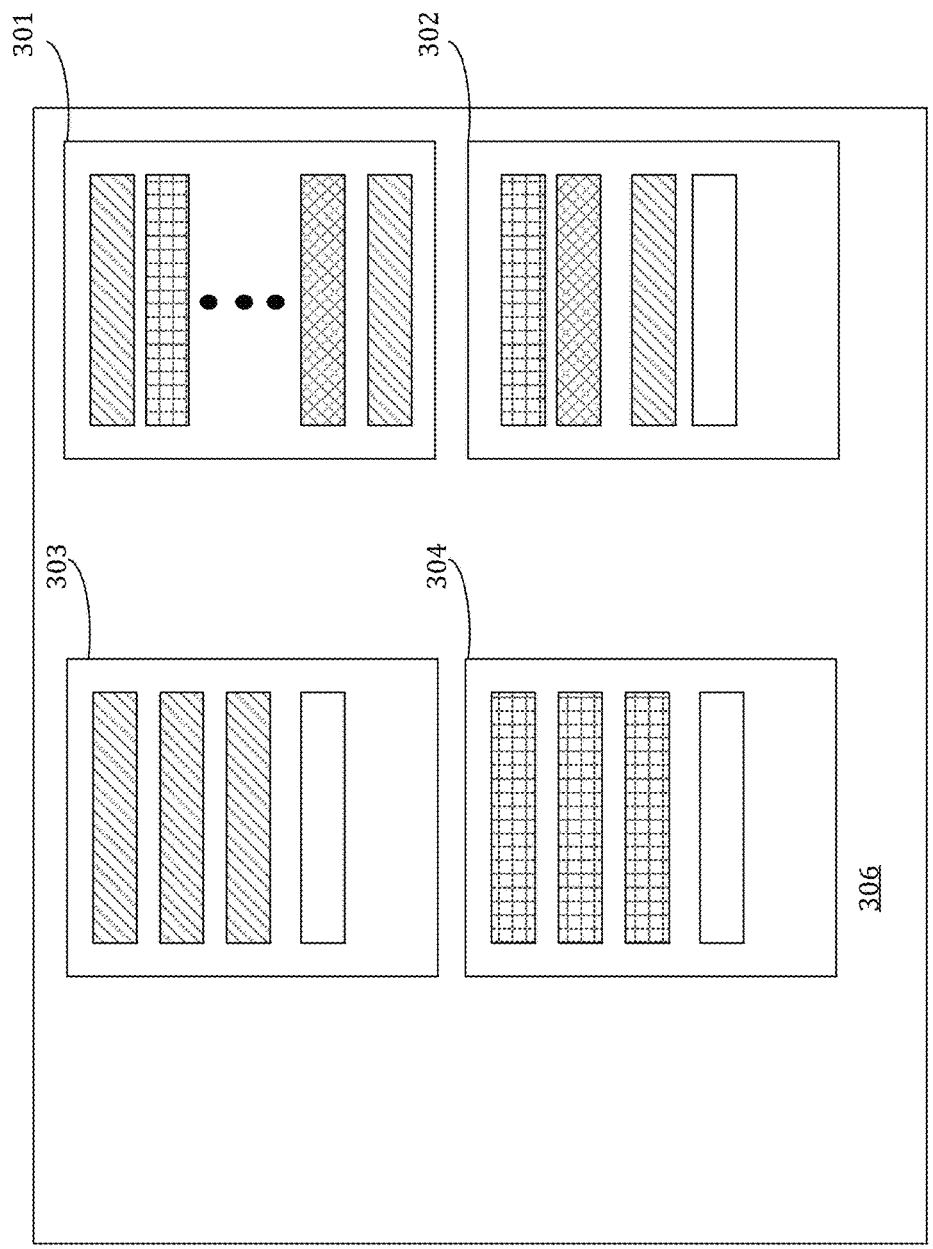
FIG. 3 illustrates an example of a shared write buffer.

FIG. 3 illustrates a write buffer 306 that was written using mixed writing techniques. Segments 301 and 302 are shared among multiple compute entities, while segment 303 is used as a private segment dedicated to the first compute entity, and segment 304 is used as a private segment dedicated to the second compute entity.

When a write request (current write request) is received by a compute entity, the compute entity may decide which writing technique should be used, depending on an evaluation of the nature of the write stream that includes the current write request, and/or according to an estimation of the contention delay and its impact on the total latency that is expected to be experienced by the user that sent the current write request.

The latency level expected by the user may be dictated by the nature of the write stream entering the system and initiated by the accessing entity (the user, a user application, a communication port, etc), since users generally expect that under lower workloads the latency should be lower than latency experienced under high workloads.

For example, when the write stream associated with the write request, received from the accessing entity, exhibits a single stream pattern, then it can be determined that the expected latency should be low. A single stream pattern refers to a sequence of write requests, where no more than one write request is being handled at any time, and a subsequent write request is received from the accessing entity only after an acknowledgement is sent for the previous write request. Users may expect that single stream of write requests should be responded with the lowest latency. The system may monitor the average number of pending write requests currently handled by the system and received from a certain accessing entity (associated with a certain user, a certain user application, received from the same network port, etc.). The average number of pending write requests relates to the time period that immediately precedes the reception of the current write request.

The system may further monitor the average latency per write request and the average contention delay per write request, that are calculated for write requests that were handled during a time period that preceded the handling of the current write request. The latency of a certain write request may be calculated as the time from the reception of the write request until the time of sending a response, or—if the network delay is considered and estimated—the time from the sending by the user and until a reception by the user of the response. The contention delay of a certain write request is the time measured from the first attempt to acquire a lock associated with the current segment and until the lock is successfully acquired.

The system may further estimate the relation between the contention delay and the latency (or the average thereof), or the weight of the average contention delay with regard to the average latency. If a substantial part of the average latency is due to contention delay—then it may be preferred to avoid using the first writing technique of writing to a shared segment, and to prefer writing to a dedicated private segment. For example, if the contention delay is more than e.g., 10%, 5%, 1%, of the latency, then the second write technique of writing to a dedicated private segment will be preferred, since the second writing technique does not involve contention.

Additionally or alternatively, if the average number of pending write requests received from a certain accessing entity is below a certain number—it means that the user does not overload the storage system and may expect a low latency, then—it may be preferred to avoid using the first write technique of writing to a shared segment, and to prefer writing to a dedicated private segment. A specific example is a case of a single stream, which is prioritized for gaining a private segment. There may be defined several levels of maximum latency according to the number of pending write requests. For example, a low latency level (e.g., less than 1 microsecond) may be defined when less than e.g., 5 write requests are pending, and initiated by a certain accessing entity, a medium latency level (e.g., below 5 milliseconds) may be defined when less than e.g., 10, 20, 50, write requests are pending, and a high latency level (e.g., 5-10 milliseconds) may be defined for above e.g., 20, 50, 100, pending write requests initiated by the certain accessing entity.

The decision of whether to use a shared or a private segment may depend on both write stream nature and the ratio between the contention delay and latency. A simple example may be: if the following formula produces a score below a certain value then the shared segment will be used, otherwise—the private segment will be used:

contention-delay/(latency*<#of pending writes>). I.e., a shared segment is preferred over a private segment when that ratio between the contention delay and the latency is low (the contention has low influence on the delay), and/or the shared segment is preferred when the number of pending write requests is high. The formula reflects taking into account both parameters.

Figure 4:
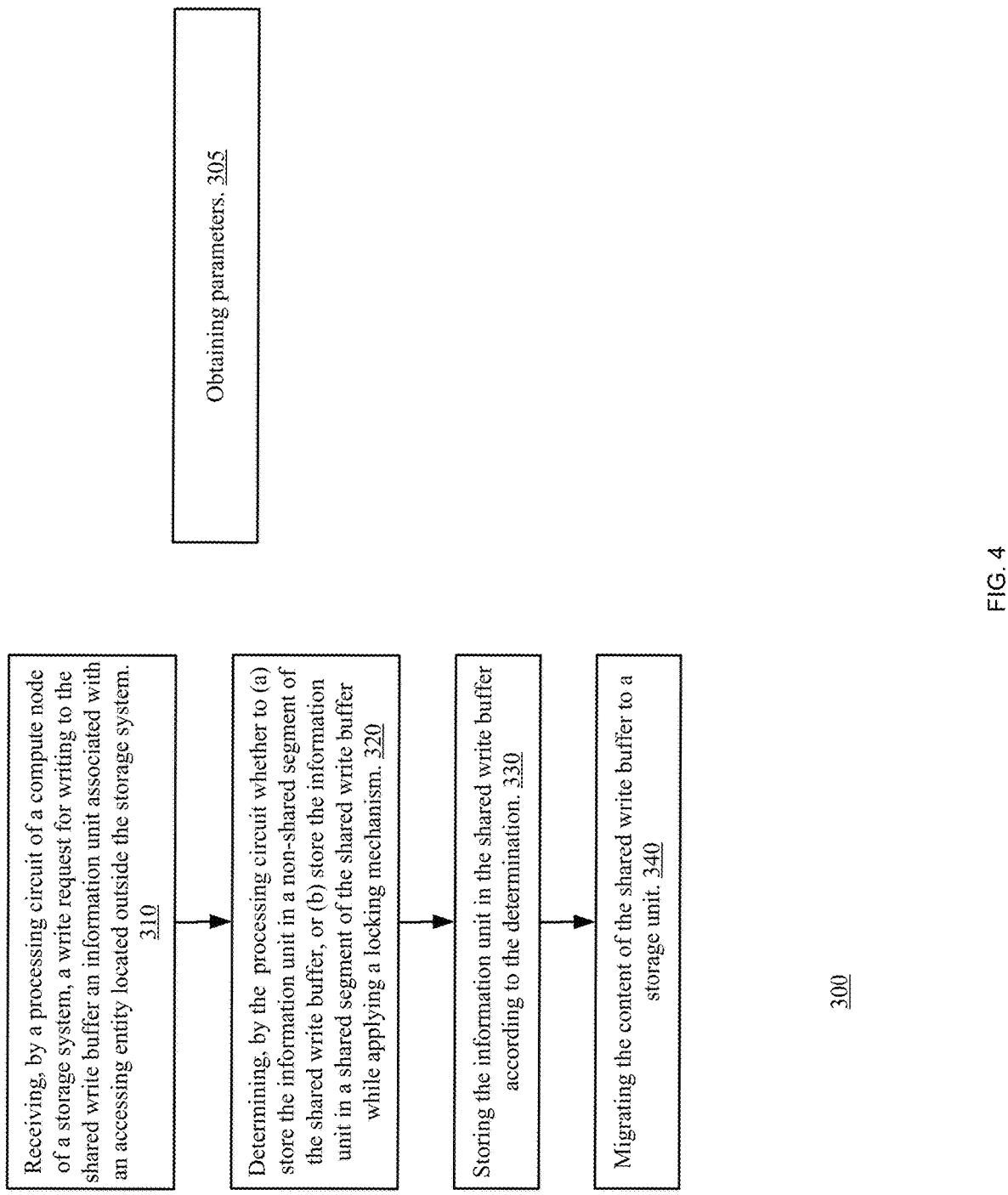
FIG. 4 illustrates an example of a method.

FIG. 4 illustrates an example of method 300 for writing data to a shared write buffer.

According to an embodiment, method 300 includes step 305 of obtaining parameters. The obtaining of the parameters may include receiving one or more parameter and/or learning one or more parameter.

According to an embodiment, the learning is based on monitoring of write requests received from one or more accessing entities, calculating average latency and average contention time—per accessing entity or for all write requests, average number of pending write requests per accessing entity, number of writes or bandwidth directed towards the current write buffer by a certain accessing entity, etc. The parameters may be calculated for the recent time period, e.g., the recent second, 10 seconds, 100 millisecond, etc.

According to an embodiment, the obtaining is executed, at least in part, during the execution of other steps of method 300.

According to an embodiment, the parameters include a writing parameter of accessing entities, a writing latency parameter associated with accessing entities, and a locking timing parameter.

According to an embodiment, step 305 includes learning a writing latency parameter and the locking timing parameter by monitoring past write requests.

According to an embodiment, method 300 includes step 310 of receiving, by a processing circuit of a compute node of a storage system, a write request for writing to the shared write buffer an information unit associated with an accessing entity located outside the storage system. An example of a processing circuit is a processing core of FIG. 4.

The shared write buffer is stored in a non-volatile memory of a storage node of the storage system. The storage node is in communication with the compute node.

According to an embodiment, step 310 is followed by step 320 of determining, by the processing circuit whether to (a) store the information unit in a non-shared segment of the shared write buffer, or (b) store the information unit in a shared segment of the shared write buffer while applying a locking mechanism. The determining is based on the parameters. The parameters include the writing parameter of the accessing entity, the writing latency parameter associated with responding to write requests from the accessing entity, and the locking timing parameter. The shared write buffer is shared between the compute node and other compute nodes of the storage system, and used for writing to segments of the shared write buffer, by multiple compute nodes. The shared segment is shared between the compute node and other compute nodes of the storage system, and used for writing information units of multiple write requests to the shared segment, by multiple compute nodes.

According to an embodiment, step 320 is followed by step 330 of storing the information unit in the shared write buffer according to the determination.

Figure 5:
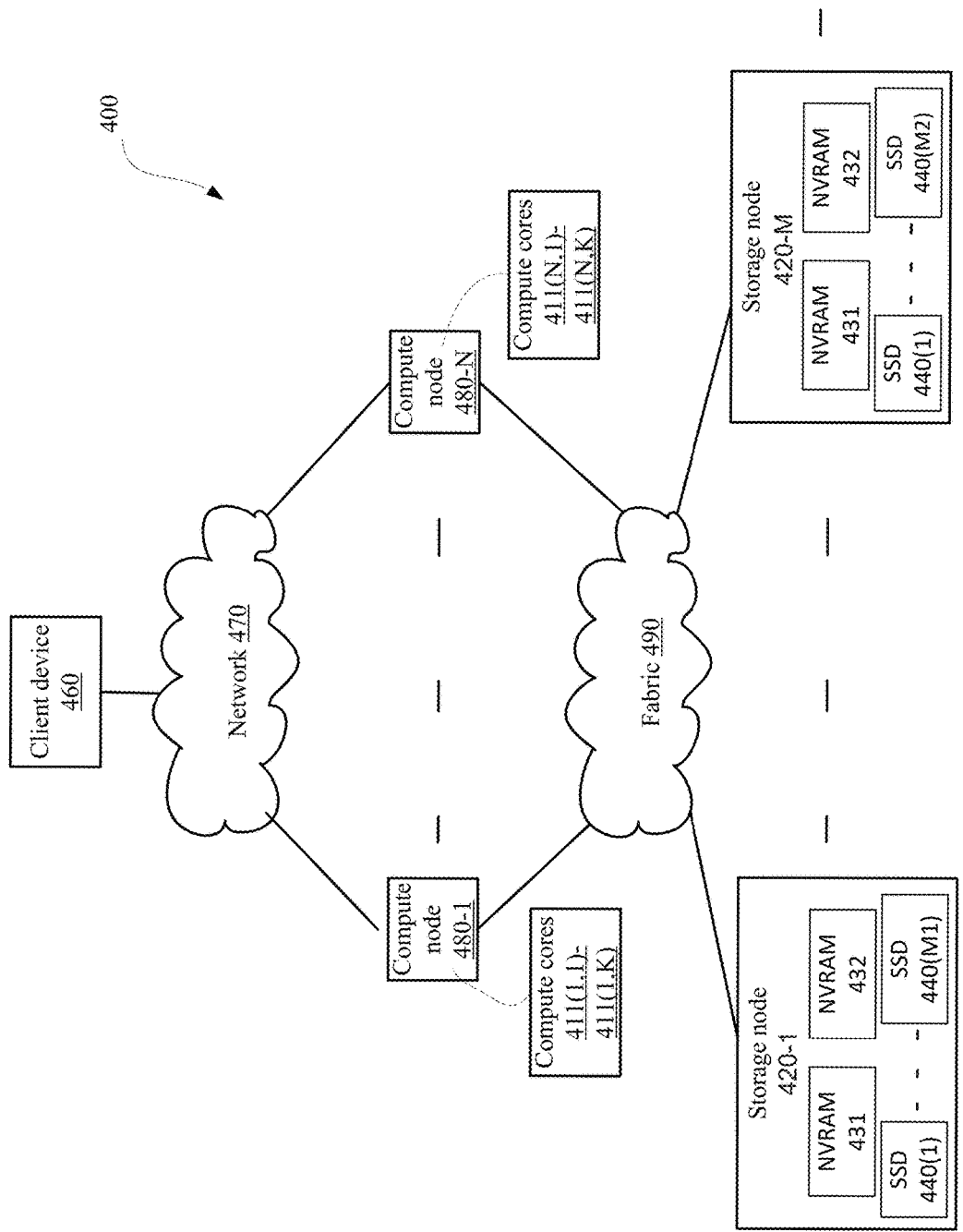
FIG. 5 is an example of a storage system.

According to an embodiment, step 330 is followed by step 340 of migrating the content of the shared write buffer to a storage unit—such as any of the SSDs of FIG. 5.

According to an embodiment, step 320 is based on any combination of any parameters listed above. The determining of step 320 may involve applying any one or more function on any of the parameters mentioned above.

According to an embodiment, the parameters include a migration parameter related to the shared write buffer. According to an embodiment, the migration parameter determines a maximal time a content is stored in the shared write buffer before being migrated to another (e.g., permanent) storage.

According to an embodiment, the writing latency parameter is an expected latency, or a maximal acceptable latency related to the accessing entity. According to another embodiment, the latency parameter is the measured latency, e.g., an average latency per write request, or per write request of a certain accessing entity.

According to an embodiment, the writing latency parameter is determined based on the writing parameter of the accessing entity. The writing parameter may include the amount of information units written to the shared write buffer in response to write requests received from the accessing entity, per period, the number of concurrent data streams associated with information units sent by the accessing entity and written in the shared write buffer, the number of pending write requests that are currently handled by the storage system, the average of pending write requests per time unit and per accessing entity, and the like. It may be assumed that higher numbers of sent information units will relax the expected latency. When the latency parameter includes the expected latency, and the writing parameter includes the number of pending write requests (or number of concurrent data streams), then—the number of pending write requests dictates the expected latency. Fewer pending write requests requires defining a lower expected latency, and may cause preferring writing to a non-shared segment, over writing to a shared segment that involves contention delay.

According to an embodiment, the locking timing parameter is indicative of a contention time (also referred to as contention delay) required to successfully lock the shared segment.

According to an embodiment, the writing latency parameter is determined based on latency measurements conducted in relation to previous write requests. According to an embodiment, step 320 is responsive to a ratio between the locking timing parameter and the writing latency parameter. If, for example, the ratio exceeds a threshold (for example 10%, 5%, 1%, and the like)—a non-shared segment may be selected for writing an information unit related to a write request.

According to an embodiment, the information unit belongs to a data stream incoming from an accessing entity, and the writing parameter includes an average number of pending write requests received from the accessing entity.

According to an embodiment, the locking timing parameter is indicative of a contention time required to successfully lock the shared segment. According to an embodiment, step 320 is based on a ratio between (i) the contention time, and (ii) a product of the writing latency parameter multiplied by the number of currently pending write requests of the accessing entity. I.e., writing to the shared segment will be preferred when: the number of currently pending write requests of the accessing entity are above a certain threshold of pending write requests, and further, when the ratio between the contention time and the latency is below a certain ratio threshold. The opposite decision is made for preferring writing to the non-shared segment.

According to an embodiment, the parameters include a shared write buffer space availability parameter. For example—the lower the availability—the tendency to allocate non-shared segment decreases. For example, if there is enough space for allocating a non-shared segment for each of the compute nodes that write to the write buffer, then—the tendency to allocate non-shared segment increases.

According to an embodiment, the parameters include a number of write requests sent by an accessing entity and written to the shared write buffer. A more active accessing entity can utilize more effectively a non-shared segment, and vice versa—when an accessing entity presents low activity (has low number of information units written in the write buffer)—its information units are preferably written to a shared segment, since it is not clear whether it would be able to fill up a non-shared segment within the lifetime of the shared write buffer (prior to migration).

FIG. 5 shows an example diagram of a storage system 400 according to the disclosed embodiments.

The storage system 400 includes a number of N compute nodes 480-1 through 480-N (hereinafter referred to individually as a compute node 480 and collectively as compute nodes 480, merely for simplicity purposes, N is an integer equal to or greater than 1). The compute nodes include (or may execute) multiple compute cores each—see for example compute cores 411(1,1)-411(1,K) and compute cores 411(N,1)-411(N,K). A compute core can be a processing circuit, a part of processing circuit, and the like. The processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits. The compute entities may be the compute nodes or the compute cores.

The storage system 400 also includes a number of M storage nodes 420-1 through 420-M (hereinafter referred to individually as a storage node 420 and collectively as storage nodes 420, merely for simplicity purposes, M is an integer equal to or greater than 1). The compute nodes 480 and the storage nodes 420 are connected through a communication fabric 490. M may equal N or may differ from N.

Each compute node 480 interfaces with multiple client devices (that include accessing entities) such as a client device 460 (or an application installed therein) via a network 470. To this end, a compute node 480 is configured to receive requests (e.g., read or write requests) and promptly serve these requests in a persistent manner. The network 470 may be, but is not limited to, the Internet, the world-wide-web (WWW), a local area network (LAN), a wide area network (WAN), and the like.

In an embodiment, a compute node 480 is configured to interface with different protocols implemented by the client devices or applications (e.g., TCP/IP, HTTP, FTP, various filesystem protocols, etc.) and to manage the read and write operations to the storage nodes 420.

According to an embodiment, the compute nodes are configured to perform one or more steps of method 300.

The storage nodes 420 provide the storage and state in the system 400. Each storage node 420 may include a plurality of SSDs, such as SSDs 440, for example storage node 420-1 includes M1 SSDs 440(1)-440(M1). According to an embodiment, the shared write buffers may be stored in NVRAM 431 and 432 of FIG. 4. The shared write buffers are large buffers, each of a size of e.g., 128 Mega bytes or more. The segments (shared or non-shared) within each write buffer, if contains metadata only, may be, for example, as small as 4K bytes.

The storage nodes 420 may be configured to have the same capacity as each other or different capacities from each other. In an embodiment, the data stored in each storage node 420 is made redundant internally within the storage node, made redundant at a different storage node, or both.

A compute nodes 480 may be configured to communicate with the storage node 420 over the communication fabric 490. It should be noted that each compute node 480 can communicate with each storage node 420 over the communication fabric 490. Each compute node is further configured to perform direct memory access, over communication fabric 490, towards storage devices of the storage nodes. There may not be a direct coupling between a compute node 480 and storage node 420.

In the embodiment, the communication fabric 490 may include an Ethernet fabric, an InfiniBand fabric, and the like. Specifically, the communication fabric 490 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for writing data to a shared write buffer, the method comprises:
    receiving, by a processing circuit of a compute node of a storage system, a write request for writing to the shared write buffer an information unit associated with an accessing entity located outside the storage system; wherein the shared write buffer is stored in a non-volatile memory of a storage node of the storage system; the storage node is in communication with the compute node;
    determining, by the processing circuit whether to (a) store the information unit in a non-shared segment of the shared write buffer, or (b) store the information unit in a shared segment of the shared write buffer while applying a locking mechanism; wherein the shared segment is used by multiple compute nodes of the storage system for storing information units, wherein the applying of the locking mechanism includes locking the shared segment before writing information units to the shared segment, wherein the determining is based on parameters, the parameters comprise a writing parameter of the accessing entity, a writing latency parameter associated with the accessing entity, and a locking timing parameter; wherein the writing parameter comprises an average number of pending write requests received from the accessing entity, and wherein the locking timing parameter is indicative of a contention time involved in locking the shared segment, wherein the determining is based on a ratio between (i) the contention time, and (ii) a product of the writing latency parameter multiplied by the average number of pending write requests of the accessing entity; and
    storing the information unit, by the processing circuit, in the non-shared segment of the shared write buffer when determining according to (a); and storing the information unit, by the processing circuit, in the shared segment of the shared write buffer when determining according to (b), wherein the storing includes locking the shared segment prior to writing the information unit in the shared segment.

2. The method according to claim 1, wherein the parameters comprise a migration parameter related to the shared write buffer.

3. The method according to claim 1, wherein the writing latency parameter is an expected latency related to the accessing entity.

4. The method according to claim 3, wherein the writing latency parameter is determined based on the writing parameter of the accessing entity.

5. The method according to claim 1, wherein the locking timing parameter is indicative of a contention time required to successfully lock the shared segment.

6. The method according to claim 1, wherein the writing latency parameter is determined based on latency measurements conducted in relation to previous write requests, wherein the determining is responsive to a ratio between the locking timing parameter and the writing latency parameter.

7. The method according to claim 1, comprising learning, by the processing circuit, the writing latency parameter and the locking timing parameter by monitoring past write requests.

8. The method according to claim 1, wherein the parameters further comprises a shared write buffer space availability parameter.

9. The method according to claim 1, wherein the parameters further comprises a number of write requests related to the accessing entity, and sent by the compute node to the shared write buffer.

10. A non-transitory computer readable medium for writing data to a shared write buffer, wherein the non-transitory computer readable medium stores instructions for:
receiving, by a processing circuit of a compute node of a storage system, a write request for writing to the shared write buffer an information unit associated with an accessing entity located outside the storage system; wherein the shared write buffer is stored in a non-volatile memory of a storage node of the storage system; the storage node is in communication with the compute node;
determining, by the processing circuit whether to (a) store the information unit in a non-shared segment of the shared write buffer, or (b) store the information unit in a shared segment of the shared write buffer while applying a locking mechanism; wherein the shared segment is used by multiple compute nodes of the storage system for storing information units, wherein the applying of the locking mechanism includes locking the shared segment before writing information units to the shared segment, wherein the determining is based on parameters, the parameters comprise a writing parameter of the accessing entity, a writing latency parameter associated with the accessing entity, and a locking timing parameter; wherein the writing parameter comprises an average number of pending write requests received from the accessing entity, and wherein the locking timing parameter is indicative of a contention time involved in locking the shared segment, wherein the determining is based on a ratio between (i) the contention time, and (ii) a product of the writing latency parameter multiplied by the average number of pending write requests of the accessing entity; and storing the information unit, by the processing circuit, in the non-shared segment of the shared write buffer when determining according to (a); and
storing the information unit, by the processing circuit, in the shared segment of the shared write buffer when determining according to (b), wherein the storing includes locking the shared segment prior to writing the information unit in the shared segment.

11. The non-transitory computer readable medium according to claim 10, wherein the parameters comprise a migration parameter related to the shared write buffer.

12. The non-transitory computer readable medium according to claim 10, wherein the writing latency parameter is an expected latency related to the accessing entity.

13. The non-transitory computer readable medium according to claim 12, wherein the writing latency parameter is determined based on the writing parameter of the accessing entity.

14. The non-transitory computer readable medium according to claim 10, wherein the locking timing parameter is indicative of a contention time required to successfully lock the shared segment.

15. The non-transitory computer readable medium according to claim 10, wherein the writing latency parameter is determined based on latency measurements conducted in relation to previous write requests, wherein the determining is responsive to a ratio between the locking timing parameter and the writing latency parameter.

16. The non-transitory computer readable medium according to claim 10, wherein the information unit belongs to a data stream, wherein the writing parameter comprises an average number of pending write requests received from the accessing entity.

17. A storage system comprising: a shared write buffer; one or more storage nodes; a compute node that comprises a processing circuit, the processing circuit is configured to:
receive a write request for writing to the shared write buffer an information unit associated with an accessing entity located outside the storage system; wherein the shared write buffer is stored in a non-volatile memory of a storage node of the one or more storage nodes; the storage node is in communication with the compute node;
determine whether to (a) store the information unit in a non-shared segment of the shared write buffer, or (b) store the information unit in a shared segment of the shared write buffer while applying a locking mechanism; wherein the shared segment is used by multiple compute nodes of the storage system for storing information units, wherein the applying of the locking mechanism includes locking the shared segment before writing information units to the shared segment, wherein the determining is based on parameters, the parameters comprise a writing parameter of the accessing entity, a writing latency parameter associated with the accessing entity, and a locking timing parameter; wherein the writing parameter comprises an average number of pending write requests received from the accessing entity, and wherein the locking timing parameter is indicative of a contention time involved in locking the shared segment, wherein the determining is based on a ratio between (i) the contention time, and (ii) a product of the writing latency parameter multiplied by the average number of pending write requests of the accessing entity; and
store the information unit in the non-shared segment of the shared write buffer when determining according to (a); and store the information unit in the shared segment of the shared write buffer when determining according to (b), wherein the storing includes locking the shared segment prior to writing the information unit in the shared segment.

* * * * *